United States Patent
Omori

(10) Patent No.: US 9,288,429 B2
(45) Date of Patent: Mar. 15, 2016

(54) RECORDING APPARATUS, ITS CONTROL METHOD AND PROGRAM, AND IMAGING APPARATUS HAVING THE RECORDING APPARATUS

(71) Applicant: CANON KABUSHIKI KAISHA, Tokyo (JP)

(72) Inventor: Noboru Omori, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 60 days.

(21) Appl. No.: 14/173,909

(22) Filed: Feb. 6, 2014

(65) Prior Publication Data

US 2014/0226950 A1     Aug. 14, 2014

(30) Foreign Application Priority Data

Feb. 12, 2013   (JP) .................................. 2013-024541

(51) Int. Cl.

| | |
|---|---|
| *H04N 5/77* | (2006.01) |
| *H04N 5/78* | (2006.01) |
| *H04N 5/92* | (2006.01) |
| *H04N 5/262* | (2006.01) |
| *H05K 7/14* | (2006.01) |
| *H04N 5/235* | (2006.01) |

(52) U.S. Cl.
CPC ............. *H04N 5/772* (2013.01); *H04N 5/2354* (2013.01)

(58) Field of Classification Search
CPC .............................. H04N 5/2354; H04N 5/772
USPC .................. 386/224, 225, 314, 337; 348/239; 307/149
See application file for complete search history.

(56) References Cited

U.S. PATENT DOCUMENTS

| | | | | |
|---|---|---|---|---|
| 6,650,829 B2* | 11/2003 | Kitajima | ................ | H04N 5/335 348/E5.091 |
| 2002/0008764 A1* | 1/2002 | Nakayama | ........... | H04N 1/2112 348/239 |
| 2007/0103007 A1* | 5/2007 | Miki | .................. | H05B 37/0272 307/149 |

FOREIGN PATENT DOCUMENTS

JP          2011-99904 A       5/2011

* cited by examiner

*Primary Examiner* — Geepy Pe
*Assistant Examiner* — Syed Hasan
(74) *Attorney, Agent, or Firm* — Carter, DeLuca, Farrell & Schmidt, LLP

(57) ABSTRACT

A imaging apparatus controls a lighting unit such that when the first recording medium is selected, the lighting unit is turned into a state different from a predetermined state in a state where recording into the first recording medium is stopped while recording into the second recording medium, and turned into the predetermined state in accordance with a recording start instruction of the first recording medium during recording into the second recording medium, and when the second recording medium is selected, the lighting unit is turned into the state different from the predetermined state in a state where recording into the second recording medium is stopped while recording into the first recording medium, and turned into the predetermined state in accordance with the recording start instruction of the second recording medium during recording into the first recording medium.

8 Claims, 11 Drawing Sheets

RECORDING APPARATUS, ITS CONTROL METHOD AND PROGRAM, AND IMAGING APPARATUS HAVING THE RECORDING APPARATUS

BACKGROUND OF THE INVENTION

1. Field of the Invention

The present invention relates to a recording apparatus and, more particularly, to an apparatus for recording a moving image into a plurality or recording mediums.

2. Description of the Related Art

In the related arts, a recording apparatus for photographing a moving image and recording into a recording medium is known. Generally, such a recording apparatus has a tally lamp for indicating that the recording (photographing) is going on to an object being photographed (for example, refer to the Official Gazette of Japanese Patent Application Laid-Open No. 2011-99904).

Such a construction for simultaneously recording a moving image into a plurality of recording mediums has also been proposed.

In the case where while a moving image for backup is recorded to one of a plurality of recording mediums, a main moving image is recorded to another recording medium in response to a recording start/stop instruction made by a photographer, since the recording for backup is being performed, the tally lamp always enters an on-lighting state.

From such an on-lighting state it is impossible to distinguish the recording which is going on intendedly by the photographer (for example, recording which is going on to a recording medium being used for main recording) from the recording which is going on not-intendedly by the photographer (for example, recording which is stopped to the recording medium being used for main recording). Therefore, there is such a problem that a person to be photographed cannot correctly grasp whether or not the recording which is going on is recording intended by the photographer.

Therefore, in consideration of the above problems, it is an aspect of the invention to provide a recording apparatus which can correctly indicate whether or not the recording which is going on is recording intended by the photographer.

SUMMARY OF THE INVENTION

To accomplish the above aspect, according to the invention, an imaging apparatus comprising: an image pickup unit; a recording unit configured to record moving image data obtained by the image pickup unit into a plurality of recording medium including a first recording medium and a second recording medium, the recording unit being capable of recording the moving image data into the second recording medium while recording the moving image data into the first recording medium; a lighting unit; a receiving unit configured to receive a selection instruction for selecting one of the first recording medium and the second recording medium and an instruction to start the recording from a user; and a control unit configured to control the lighting unit in accordance with a result of the selection caused by the instruction, wherein in a case where the first recording medium is selected, the control unit controls the lighting unit so as to turn into a state different from a predetermined state in a state where recording the moving image data into the first recording medium is stopped and the moving image data is being recorded into the second recording medium, and to turn into the predetermined state in accordance with the recording start instruction to start recording the moving image data into the first recording medium during recording the moving image data into the second recording medium, and in a case where the second recording medium is selected, the control unit controls the lighting unit so as to turn into the state different from the predetermined state in a state where recording the moving image data into the second recording medium is stopped and the moving image data is being recorded into the first recording medium, and so turn into the predetermined state in accordance with the recording start instruction to start recording the moving image data into the second recording medium during recording the moving image data into the first recording medium.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the present invention will be described in detail below with reference to the drawings.

First Embodiment

Figure 1:
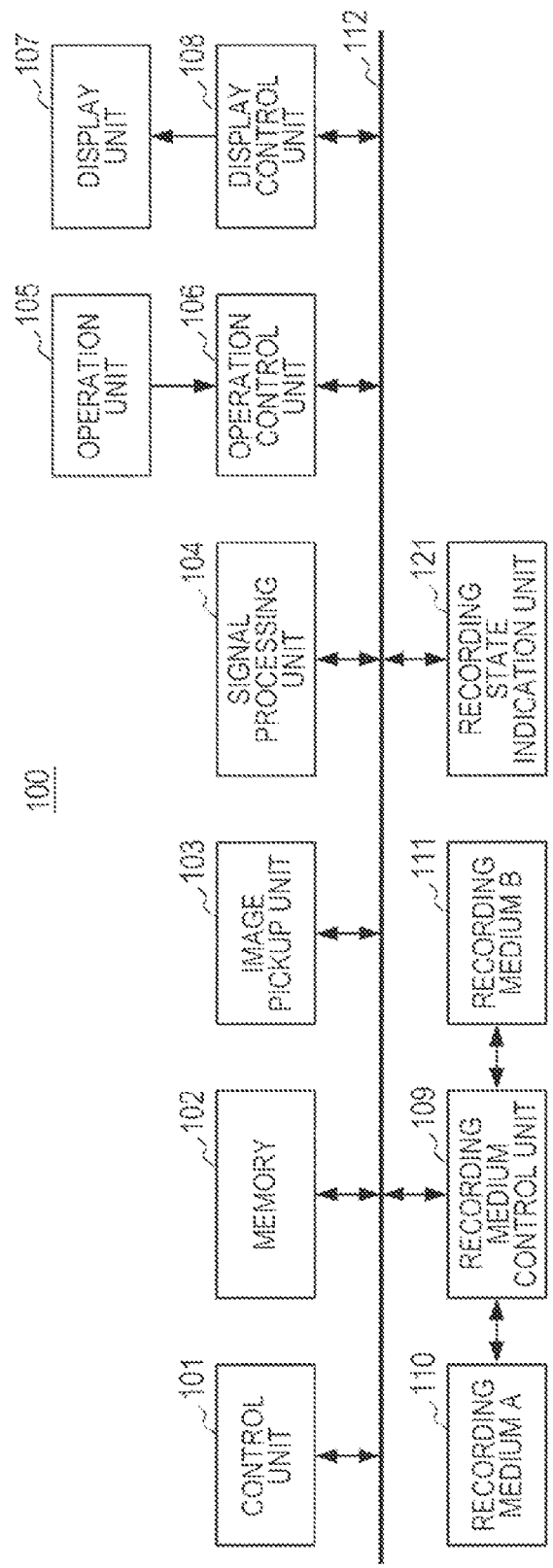
FIG. 1 is a block diagram of an imaging apparatus to which a recording apparatus according to the first embodiment of the invention is applied.

FIG. 1 illustrates a schematic block diagram of a video camera as an example of an image pickup apparatus to which a recording apparatus according to the first embodiment of the invention is applied.

First, a construction of a video camera 100 will be described with reference to FIG. 1.

In the diagram, a control unit 101 has a microcomputer and controls each unit of the video camera 100 in accordance with a program, information stored in a memory 102, information from an operation control unit 106, or the like. The memory 102 temporarily stores a moving image signal obtained by photographing an object image by an image pickup unit 103 and coded moving image data. The memory 102 also stores information such as management information in a first recording medium A110 and a second recording medium B111 and the like.

The image pickup unit 103 functions as an input unit for inputting moving image data, photographs an object, and outputs the moving image data. Upon recording, a signal processing unit 104 executes a predetermined signal processing to the moving image data obtained by the image pickup unit 103 and codes in accordance with an MPEG system. Upon reproduction, the signal processing unit 104 decodes the reproduced moving image data.

An operation unit 105 has a power switch, an instruction switch to start/stop the photographing, an instruction switch to start/stop the backup recording, and a mode switch to change over a photographing mode and a reproduction mode. The operation unit 105 also has an index change-over switch to change over index classes in the reproduction mode, a switch to operate a menu display screen, a switch to set a target recording medium of indicating a recording state indication, and the like. Each switch may be constructed by a physical button or a button or knob such as touch panel, or the like which is displayed on a display unit 107. The photographing start/stop instruction switch may be a trigger button or the like for instructing the start/stop of the recording to a main recording medium. The backup recording start/stop instruction switch may be a valid/invalid button displayed on the menu display screen for instructing the start/stop or the recording to a backup recording medium or a physical button to which a function of instructing the start/stop of the recording to the backup recording medium is allocated. The operation control unit 106 indicates operation information to the control unit 101 in response to an instruction from the operation unit 105.

Upon photographing, a display control unit 108 displays an image corresponding to the moving image data obtained by the image pickup unit 103 to the display unit 107. Upon reproduction, the display control unit 108 displays an image corresponding to the reproduced moving image data. The display control unit 108 displays the menu display screen and various kinds of information such as setting by each switch and the like on the display unit 107.

A recording medium control unit 109 records the moving image data in the recording medium A110 and the recording medium B111 and reproduces the moving image data from the recording medium A110 and the recording medium B111, respectively. Each of the recording medium AUG and the recording medium B111 is a random access recording medium such as a flash memory card or the like. The recording medium A110 and the recording medium B111 are detachable to the video camera 100 by a loading and unloading mechanism (not shown). In accordance with a well-known file system such as an FAT file system or the like, the recording medium control unit 109 manages various kinds of data, as a file, which is recorded into the recording medium A110 and the recording medium B111.

A recording state indication unit 121 is called a tally lamp or tally light and is constructed by an LED (Light-Emitting Diode) or the like arranged in a main body of the video camera 100. The recording state indication unit 121 performs turning on (first indication state), turning off (second indication state), or turning on and off (third indication state) in accordance with recording states of the recording medium A110 and the recording medium B111 and indicates the recording states to the photographer or a person to be photographed.

A data bus 112 transmits and receives data and commands to/from the units.

Subsequently, a fundamental function of the video camera 100 will be described.

First, the operation at the time when the video camera 100 is activated, in a state where the mode switch is set into the photographing mode will be described. When a power source is turned on by the operation unit 105 in the state where the mode switch is set into the photographing mode, the moving image data obtained by the image pickup unit 103 is output to the display control unit 108 through the data bus 112. The image pickup unit 103 outputs the moving image data in accordance with the designated number of frames per unit time. The display control unit 108 displays a moving image corresponding to the moving image data from the image pickup unit 103 to the display unit 107. At this stage, the video camera 100 is in a recording stop state where the moving image data is not recorded in the recording medium. A110 and the recording medium B111.

Subsequently, each operation of the recording start, addition of a recording medium, reduction of a recording medium, and recording stop in the photographing mode will be described. The two recording mediums such as recording medium A110 and recording medium B111 can be loaded to the video camera 100. The video camera 100 can individually instruct the recording start and recording stop to each of those recording mediums.

The recording start operation is an operation for shifting the video camera from a state where the moving image data is not recorded to any of the recording mediums to a state where the moving image data is recorded to one of the recording mediums. The recording medium adding operation is an operation for shifting the video camera from a state where the moving image data is recorded to one of the recording mediums to a state where the moving image data is recorded to two recording mediums. This operation effects as a recording start operation with respect to a recording medium to be added. The recording medium reducing operation is an operation for shifting the video camera from a state where the moving image data is recorded to two recording mediums to a state where the moving image data is recorded to one recording medium. This operation effects as a recording stop operation with respect to a recording medium to be reduced. The recording stop operation is an operation for shifting the video camera from a state where the moving image data is recorded to one or more recording mediums to a state where the moving image data is not recorded to any of the recording mediums.

The recording start operation is a normal recording mode will be described. By operating the operation unit 105 in the recording stop state, the user selects one of the recording medium A110 and the recording medium B111 as a recording medium which is a recording destination in the normal recording mode. If there is a recording start instruction from the operation unit 105 in the recording stop state, the moving image data which is output from the image pickup unit 103 is sent to the memory 102 and is temporarily stored therein. The moving image data stored in the memory 102 is sequentially read out in order suitable for a coding processing which is executed in toe signal processing unit 104. The signal processing unit 104 codes the moving image data which is read out of the memory 102 in accordance with the MPEG system and stores the coded moving image data into the memory 102 again. The control unit 101 stores various kinds or control information and the like into the memory 102 and multiplexes to the coded moving image data. Thus, stream data is generated. When the stream data or a predetermined amount is stored in the memory 102, the recording medium control unit 109 reads out the stream data from the memory 102 and records into one of the recording medium A110 and the recording medium B111 selected as a recording destination in the normal recording mode as mentioned above. After that, a similar processing is continued until one of the recording medium adding instruction, the recording medium reducing instruction, and the recording stop instruction is input.

The recording medium adding operation will now he described. A case where the instruction of the recording medium addition to the unrecorded recording medium is made by the operation unit 105 in the state where the moving image data is being recorded to one of the recording medium A110 and the recording medium B111 is now considered. In this case, since the video camera is in a state where the generation of the stream data and the storage into the memory 102 are already continued, the stream data is read eat of the memory 102 and recorded into the two recording mediums. The generation of the stream data and the storage into the memory 102 are continuously performed. After that, a similar processing is executed until either the recording medium reducing instruction or the recording step instruction is input. For example, if the recording medium adding instruction is input during recording the moving image data to the recording medium A110, recording the moving image data to the recording medium B111 is started by the control unit 101. That is, the control unit 101 instructs the recording medium control unit 109 so as to start recording the moving image data into the recording medium B111 in response to the recording medium adding instruction.

The recording medium reducing operation will now be described. When the recording medium reducing instruction is made by the operation unit 105 in a state where the moving image data is being recorded to the two recording mediums, the recording to one of the recording medium A110 and the recording medium B111 is stopped. It is assumed here that recording the moving image data into the recording medium which is not selected as a recording destination in the normal recording mode is stopped in response to the recording medium reducing instruction. Generating the stream data, storing into the memory 102, and recording the moving image data into another recording medium are continued. After that, a similar processing is continued until either the recording medium adding instruction or the recording stop instruction is input. For example, if the recording medium A110 is selected as a recording destination in the normal recording mode, the control unit 101 instructs the recording medium control unit 109 so as to stop recording the moving image data to the recording medium B111 into response to the recording medium reducing instruction. The recording medium control unit 109 stops recording the moving image data into the recording medium B111. The recording medium control unit 109 continues recording the moving image data into the recording medium A110.

The recording stop operation will now be described. When the recording stop instruction is made by the operation unit 105, the control unit 101 stops recording the moving image data into all of the recording mediums. Generating the stream data and storing into the memory 102 are also stopped. For example, if the recording stop instruction is made when the moving image data is simultaneously being recorded to the two recording mediums A110 and B111, the control unit 101 instructs the recording medium control unit 109 so as to stop recording the moving image data into each of the recording mediums. The recording medium control unit 109 steps recording the moving image data into each recording medium in response to the recording stop instruction.

In the present embodiment, the data of a series of scenes recorded in each recording medium for a period of time from the recording start instruction until the recording stop instruction for every recording medium is managed as one moving image data.

Subsequently, the operation upon setting of a backup recording mode in the photographing mode will be described. In the backup recording mode, one of the recording medium A110 and the recording medium B111 is used to record desired moving image data of the user (main use) and the other is used for backup (backup use). By operating the operation unit 105 in the recording stop state, the user can designate one of the recording medium A110 and the recording medium B111 as a recording medium for main use in the backup recording mode. In the following description, it is assumed that the recording medium A110 is set as a medium for main use and the recording medium B111 is set as a medium for backup use.

When the user sets the backup recording mode to be valid by the operation unit 105, the control unit 101 starts recording the moving image data into the recording medium B111 set as a recording medium for backup use irrespective of the recording state of the recording medium A110. Further, when the user sets the backup recording mode to be invalid by the operation unit 105, the control unit 101 stops recording the moving image data info the recording medium B111 irrespective of the recording state of the recording medium A110. That is, the processing for setting the backup recording mode to be valid is substantially the same as the recording start instruction to the recording medium B111, end the processing for setting the backup recording mode to be invalid is substantially the same as the recording stop instruction to the recording medium B111. Therefore, the moving image data is continuously recorded to the recording medium for backup use for a period of time from the backup recording mode is set to be valid until the backup recording mode is set to be invalid.

If the recording start instruction to the main recording medium is made by the user during recording the moving image data in the backup recording mode, the control omit 101 instructs the recording medium control unit 109 so as to start recording the moving image data to the main recording medium. If the recording stop instruction to the main recording medium is made by the user during recording the moving image data in the backup recording mode, the control unit 101 instructs the recording medium control unit 109 so as to stop recording the moving image data into the main recording medium.

If the recording start instruction to the main recording medium is made during recording the moving image data into the backup recording medium in the backup recording mode as mentioned above, the same moving image data is simultaneously recorded to both of the main recording medium and the backup recording medium.

The recording start/stop instruction to the recording medium A110 and the recording start/stop instruction to the recording medium B111 (backup mode recording valid/invalid) can be simultaneously set or can be individually set.

Subsequently, the operation which is executed when the recording medium is set as a target of recording state indication will be described. By operating the operation unit 105, the user can set which one of the recording states of the recording medium A110 and the recording medium B111 is indicated. Such setting information is stored into the memory 102 by the control unit 101 and is referred to in the control operation or the recording state indication unit 121 or the like. When the recording medium A110 is set to the target of indication of the recording state, irrespective of the recording state of the recording medium B111, if the recording medium A110 is in an on-recording state, the control unit 101 sets the recording state indication unit 121 to an on-lighting state, and if the recording medium A110 is in a recording stop state, the control unit 101 sets the recording state indication unit 121 to an off-lighting state. When the recording medium B111 is set to the target of indication of the recording state, irrespective of the recording state of the recording medium A110, the control unit 101 sets the recording state indication unit 121 to the on-lighting state, and if the recording medium B111 is in the recording stop state, the control unit 101 sets the recording state indication unit 121 to the off-lighting state. Further, when both of the recording medium A110 and the recording medium B111 are set to the targets of indication or the recording state, if one or both of the recording medium A110 and the recording medium B111 is/are in the on-recording state, the recording state indication unit 121 is turned on. If both of the recording medium A110 and the recording medium B111 are in the recording stop state, the recording state indication unit 121 is turned off.

An example of the operation of the recording state indication unit 121 will be described with reference to FIGS. 2, 3, and 4. In any of those diagrams, a case where the recording medium A110 is set to the target of indication or the recording state will now be described as an example.

Figure 2:
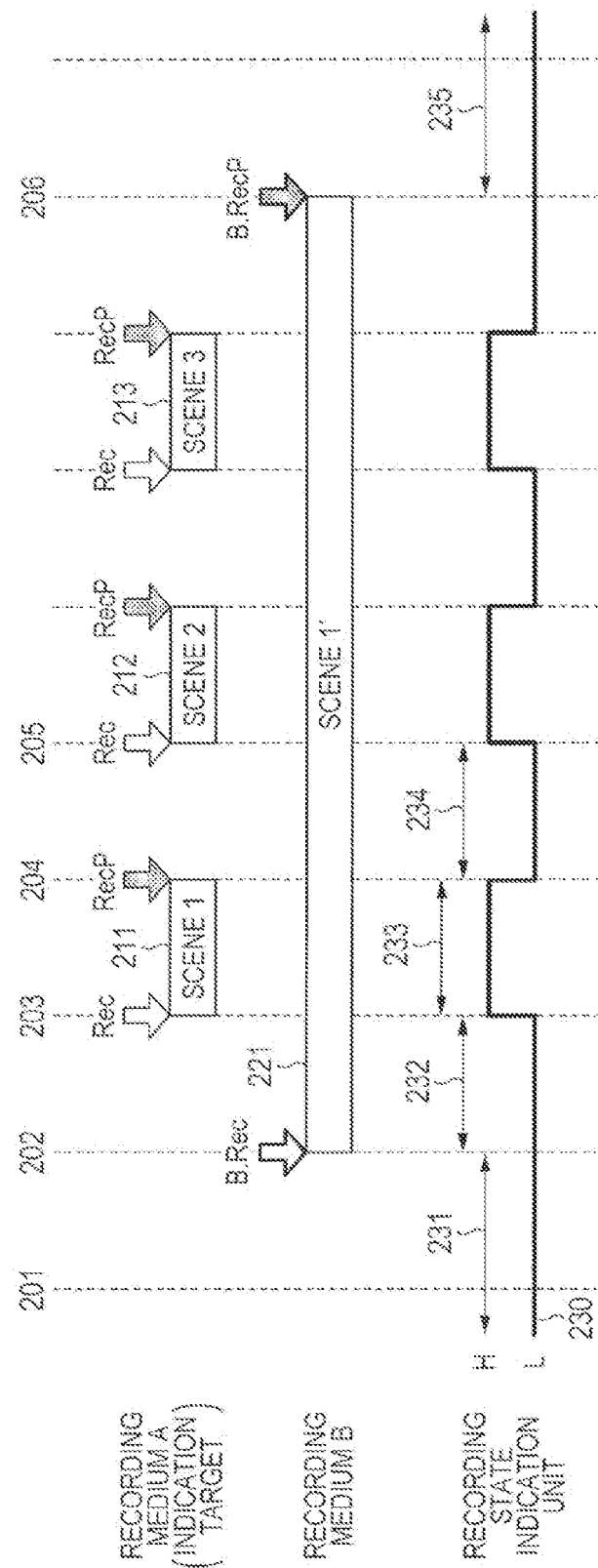
FIG. 2 is a diagram illustrating an example of an indication of a recording state according to the first embodiment of the invention.
Figure 3:
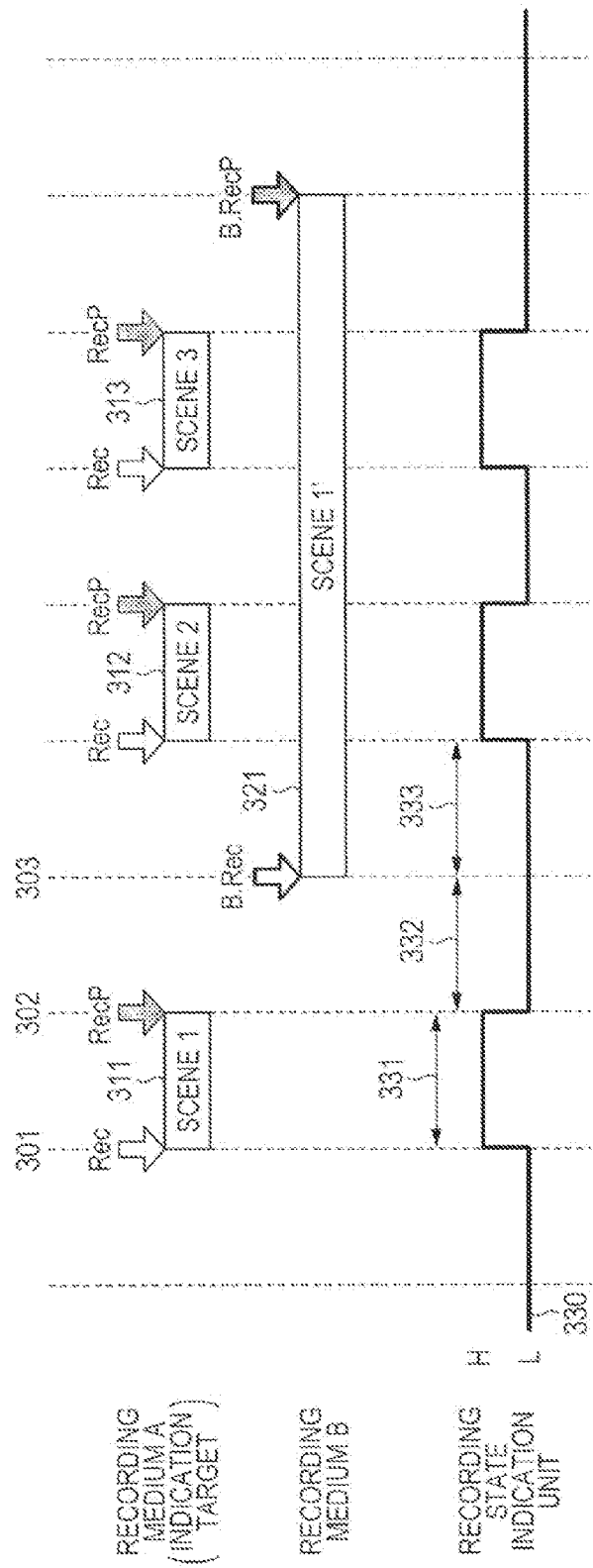
FIG. 3 is a diagram illustrating an example of an indication of a recording state according to the first embodiment of the invention.
Figure 4:
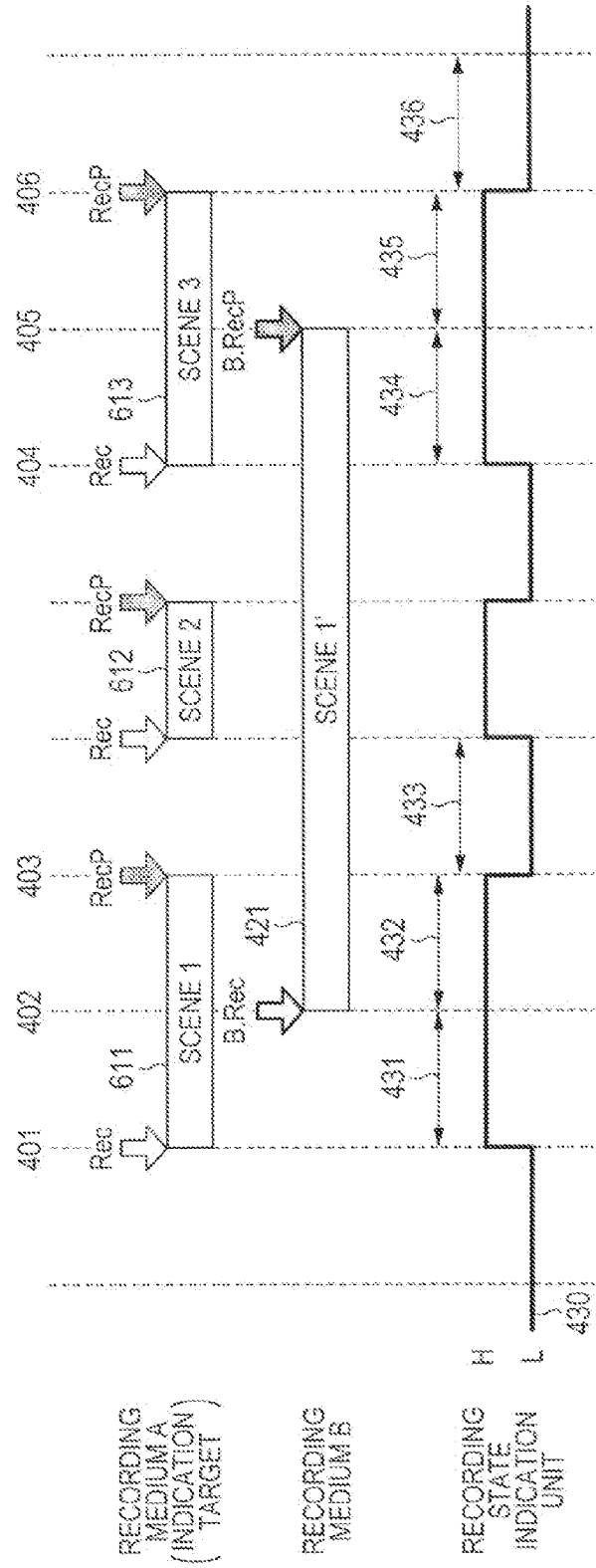
FIG. 4 is a diagram illustrating an example of an indication of a recording state according to the first embodiment of the invention.

FIGS. 2 to 4 illustrate the example in the case where the recording medium A110 is set as an indication target.

Reference numerals 201 to 206 denote that the recording start instruction and the recording stop instruction are made to the recording medium A110 and the recording medium B111 at each timing. Reference numerals 211 to 213 denote moving image data recorded in the recording medium A110. Reference numeral 221 denotes moving image data recorded in the recording medium B111. Reference numerals 230 to 235 denote indication states of the recording state indication unit 121. It is assumed that the H (High) side corresponds to the on-lighting state and the L (Low) side corresponds to the off-lighting state.

First, at timing of 201, since both of the recording medium A110 and the recording medium B111 are in the recording stop state, the recording state indication unit 121 as in the off-lighting state. At timing of 202, the recording to the recording medium B111 is started. Since the recording medium A110 which is set to the indication target is in the recording stop state, the control unit 101 keeps the recording state indication unit 121 in the off-lighting state. Since the recording start instruction to the recording medium A110 is made at timing of 203, the control unit 101 starts recording the moving image data into the recording medium A110 and sets the recording state indication unit 121 into the on-lighting state. Since the recording stop instruction to the recording medium A110 is made at timing of 204, the control unit 101 sets the recording state indication unit 121 into the off-lighting state. Since the recording start instruction to the recording medium A110 is trade again at timing of 205, the control unit 101 sets the recording state indication unit 121 into the on-lighting state. Those controls are continuously performed and recording into the recording medium B111 is stopped at timing of 206. Since the recording medium A110 is still in the recording stop state, the control unit 101 sets the recording state indication unit 121 into the off-lighting state. By those control, the recording state indication unit 121 is set into the off-lighting state for an interval such as 231, 232, 234, 235, or the like and is set into the on-lighting state for an interval such as 233 or the like.

In FIG. 3, reference numerals 301 to 303 denote that the recording start instruction and the recording stop instruction are made to the recording medium A110 and the recording medium B111 at each timing. Reference numerals 311 to 313 denote moving image data recorded in the recording medium A110. Reference numeral 321 denotes moving image data recorded in the recording medium B111. Reference numerals 330 to 333 denote indication states of the recording state indication unit 121. It is assumed that the H (High) side corresponds to the on-lighting state and the L (Low) side corresponds to the off-lighting state.

First, the recording start instruction to the recording medium A110 is made at timing of 301 and recording into the recording medium A110 in the normal recording mode is performed. Therefore, the control unit 101 sets the recording state indication unit 121 into the on-lighting state. Since the recording stop instruction to the recording medium A110 is made at timing of 302, the control unit 101 sets the recording state indication unit 121 into the off-lighting state. The backup recording start instruction is made at timing of 303 and the control unit 101 starts the recording of the moving image data to the recording medium B111 in the backup recording mode. Since the recording medium A110 which is set to an indication target in the backup recording mode is in the recording stop state, the control unit 101 keeps the recording state indication unit 121 in the off-lighting state. By those control, the recording state indication unit 121 is set into the off-lighting state for an interval such as 332, 333, or the like and is set into the on-lighting state for an interval such as 331 or the like.

FIG. 4 illustrates a recording state of each recording medium and a state of the recording state indication unit 121 in the case where the user independently instructs the recording start and stop to the recording medium A110 and the recording medium B111 in the normal recording mode. In FIG. 4, reference numerals 401 to 406 denote that the recording start instruction and the recording stop instruction are made to the recording medium A110 and the recording medium B111 at each timing. Reference numerals 411 to 413 denote moving image data recorded in the recording medium A110. Reference numeral 421 denotes moving image data recorded in the recording medium B111. Reference numerals 430 to 436 denote control of the recording state indication unit 121. It is assumed that the K (High) side correspond to the on-lighting state and the L (Low) side corresponds to the off-lighting state.

First, since the recording start instruction to the recording medium A110 is made at timing of 401, the control unit 101 starts recording the moving image data to the recording medium A110. Therefore, the control unit 101 sets the recording stare indication unit 121 into the on-lighting state. The recording start instruction to the recording medium B111 is made at timing of 402, the control unit 101 starts recording the moving image data into the recording medium B111. Since the recording medium A110 which is set as an indication target is in the recording state at timing of 402, the control unit 101 sets the recording state indication unit 121 into the on-lighting state. Since the recording stop instruction to the recording medium A110 is made at timing of 403, the control unit 101 stops the recording of the moving image data to the recording medium A110 and sets the recording state indication unit 121 into the off-lighting state. Since the recording start instruction to the recording medium A110 is made at timing of 404, the control unit 101 sets the recording state indication unit 121 into the on-lighting state. The recording stop instruction to the recording medium B111 is made at timing of 405 and the control unit 101 stops recording the moving image data into the recording medium B111. Since the recording medium A110 is in the recording state, the control unit 101 keeps the recording state indication unit 121 in the on-lighting state. Since the recording stop instruction to the recording medium A110 is made at timing of 406, the control unit 101 sets the recording state indication unit 121 into the off-lighting state. By those control, the recording state indication unit 121 is set into the off-light state for an interval such as 433, 436, or the like and is set into the on-lighting state for an interval such as 431, 432, 434, 435, or the like.

Figure 5:
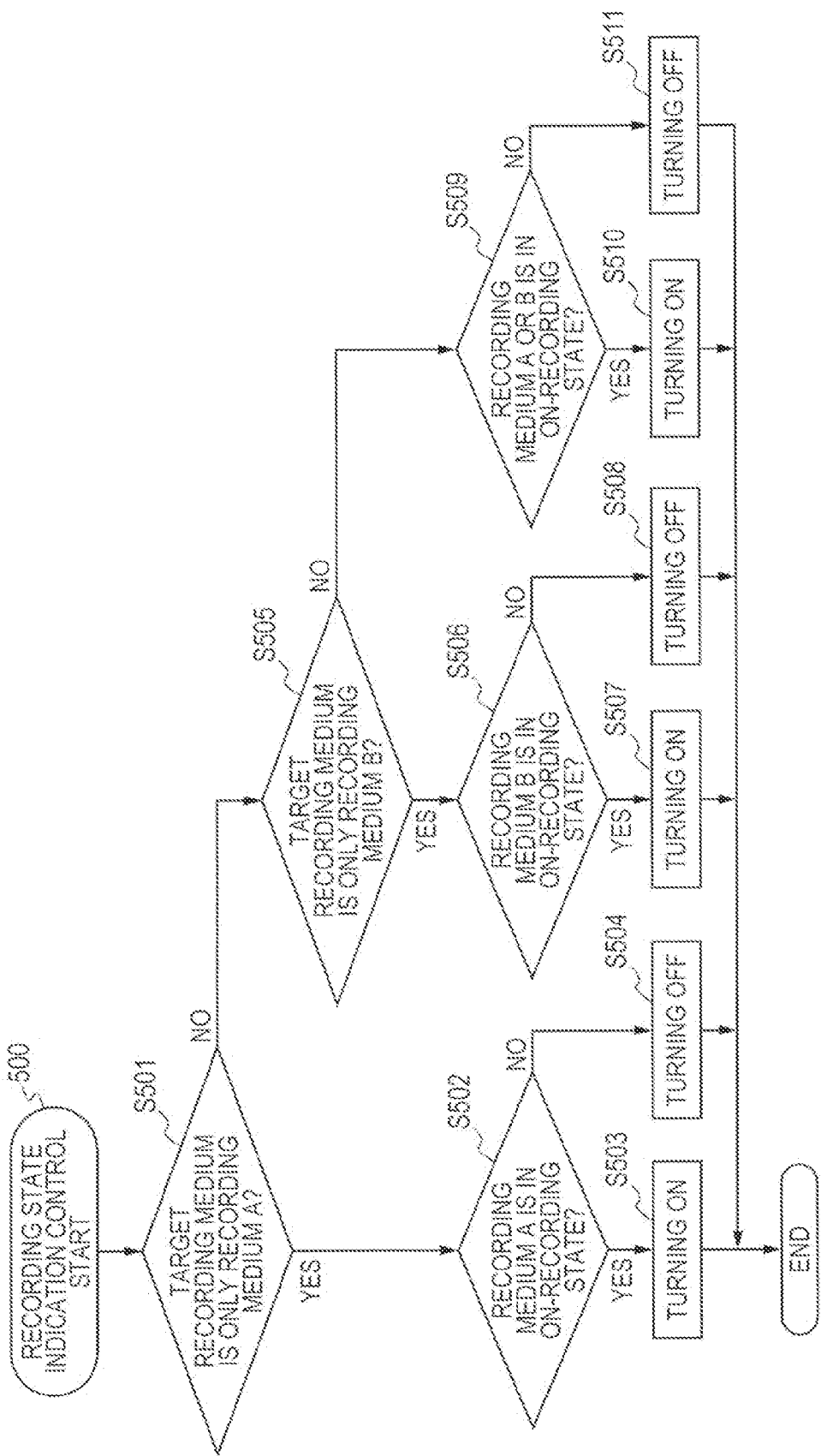
FIG. 5 is a diagram illustrating a flowchart for the control operation of the indication of the recording state according to the first embodiment or the invention.
Figure 6:
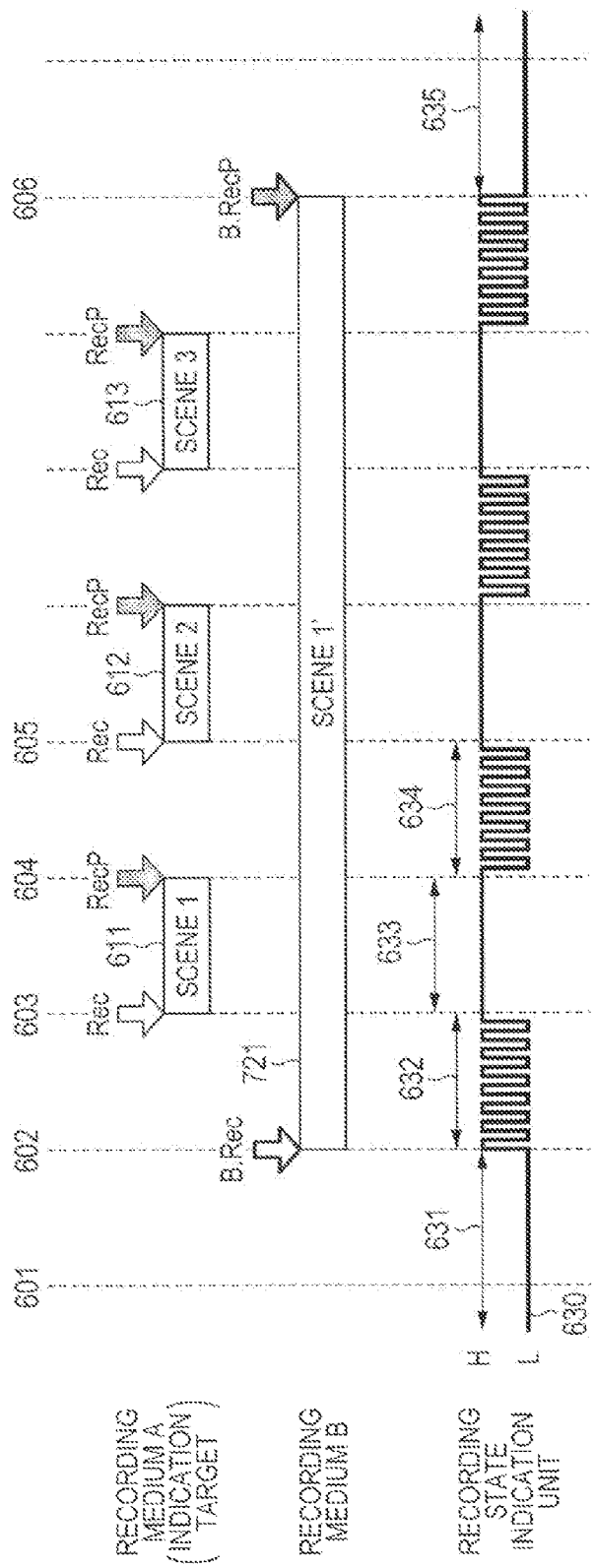
FIG. 6 is a diagram illustrating an example of an indication of a recording state according to the second embodiment of the invention.

Subsequently, the control operation of the recording state indication unit 121 in the recording mode will be described with reference to a flowchart shown in FIG. 5. A processing of FIG. 6 is executed in such a way that the control unit 101 controls each unit.

Subsequently, the operation by a flowchart 500 of FIG. 5 will be described.

The flowchart 500 shows the control operation of the recording state indication unit 121 and is periodically executed in the case of a setting for indicating the recording state. In the case of a setting in which the indication of the recording state is not performed, for example, in the case of an OFF setting of the tally lamp, the flowchart 500 is not executed.

First, the control unit 101 discriminates the target recording medium of recording stare indication (S501). This discrimination can be performed by referring to the setting information of the indication target stored in the memory 102. When the target is only the recording medium A110, the control unit 101 advances to S502. If NO, the control unit 101 advances to S505. When the target is only the recording medium A110, the control unit 101 detects the state of the recording medium A110 by the recording medium control unit 109 and discriminates whether or not the recording medium is in an on-recording state (S502). As a result of the discrimination, if the recording medium A110 is in the on-recording state, the control unit 101 turns on the recording state indication unit 121 (S503). If the recording medium A110 is not in the on-recording state, the control unit 101 turns off the recording state indication unit 121 (S504). In S505, the control unit 101 discriminates the target recording medium of the recording state indication. When the target is only the recording medium B111, the control unit 101 advances to S506. If NO, the control unit 101 advances to S509. When the target is only the recording medium B111, the control unit 101 detects the state of the recording medium B111 by the recording medium control unit 109 and discriminates whether or not the recording medium B111 is in the on-recording state (S506). If the recording medium B111 is in the on-recording state, the control unit 101 turns on the recording state indication unit 121 (S507). If the recording medium B111 is not in the on-recording state, the control unit 101 turns off the recording state indication unit 121 (S508). At S509, the control unit 101 operates on the assumption that the target recording medium or the recording state indication is both or the recording medium A110 and the recording medium B111. The control unit 101 obtains the states or the recording medium A110 and the recording medium B111 through the recording medium control unit 109 and discriminates whether or not one or both of the recording medium A110 and the recording medium B111 is/are in the on-recording state (S509). When one or both of the recording medium A110 and the recording medium B111 is/are in the on-recording state, the recording state indication unit 121 is turned on (S510). If the recording medium A110 and the recording medium B111 are both not in the on-recording state, the recording state indication unit 121 is turned off (S511). The flowchart 500 has been thus described above.

As mentioned above, in the present embodiment, the user can set one or both of the two recording mediums as indication targets. Therefore, for example, in the case where one of the two recording mediums is set to a medium for main use, the recording start/stop instruction to such a medium is made, the other is set to a medium for backup use, the recording start/stop instruction to such a medium is made, and the recording is performed, the recording state indication unit can be controlled in accordance with the recording state of the recording medium. Specifically speaking, for example, when the main recording medium is the indication target, the recording state indication unit is turned on during recording into such a medium, and the recording state indication unit is turned off when the main recording medium is in the recording stop state. Thus, a fact that the main recording medium is in the on-recording state, that is, it is in the on-recording state which is desired by the user can be correctly indicated to the person to be photographed.

In the present embodiment, since the indication target can be selectively set from a plurality of recording mediums, the user can visually confirm that the indication of the recording state is an indication of which one of the main recording medium and the backup recording medium, and it is useful. Therefore, for example, in the case where the recording state indication unit 121 is constructed by using a light-emitting element such as a light-emitting diode or the like, it is also possible to construct in such a manner that the emission color is switched in accordance with the recording medium set as an indication target. It is also possible to construct in such a manner that the setting of the recording medium which is an indication target is displayed to the display unit 107 so that the photographer can visually confirm it.

Modification of the First Embodiment

A modification of the operation of the first embodiment will now be described. In the first embodiment, for example, when the indication target is the recording medium A110, if its recording is stopped, even it the recording medium B111 is in the on-recording state, the recording state indication suit 121 is turned off. On the other hand, in the present modification, even if the recording of the recording medium A110 which is an indication target is stopped, so long as the recording of the recording medium B111 is being performed, the recording state indication unit 121 is turned on and off. The modification will now be described hereinbelow with reference to the drawings.

Since a schematic construction of the video camera to which a recording apparatus of the modification is similar to that of the first embodiment (FIG. 1), its description is omitted here. Since the operations in the recording stop state and the on-recording state in the recording medium A110 for main use and the operations in the recording stop state and on-recording state in the recording medium B111 for backup use are similar to those shown in flowcharts 400, 410, 420, and 430 in FIG. 4, their description is also omitted here.

First, the indicating operation in the present modification in the case where the recording medium as an indication target of the recording state is set will be described.

By operating the operation unit 105, the user can set which one of the recording states of the recording medium A110 end the recording medium B111 is to be indicated with priority. Information of the setting is stored into the memory 102 by the control unit 101 and is referred so in the control operation of the recording state indication unit 121 or the like. If the recording medium A110 is set as a preferential indication target of the recording state, when the recording medium A110 is in the on-recording state, the recording state indication unit 121 is turned on. When the recording medium A110 is in the recording stop state, if the recording medium B111 is in the on-recording state, the recording state indication unit 121 is turned on and off. When both of the recording medium A110 and the recording medium B111 are in the recording stop state, the recording state indication unit 121 is turned off. If the recording medium B111 is set as a preferential indication target of the recording state, when the recording medium B111 is in the on-recording state, the recording state indication unit 121 is turned on. When the recording medium B111 is in the recording stop state, if the recording medium A110 is in the on-recording state, the recording state indication unit 121 is turned on and off. When both of the recording medium A110 and the recording medium B111 are in the recording stop state, the recording state indication unit 121 is turned off. Further, in the case where both of the recording medium A110 and the recording medium B111 are set as preferential indication targets of the recording state, when one or both of the recording medium A110 and the recording medium B111 is/are in the on-recording state, the recording state indication unit 121 is turned on. When both of the recording medium A110 and the recording medium B111 are in the recording stop state, the recording state indication unit 121 is turned off.

An example of the operation of the recording state indication unit 121 will be described with reference to FIGS. 6, 7, and 8. In any of those diagrams, a case where the recording medium A110 is set to the preferential indication target of the recording state will now be described as an example.

In FIG. 6, reference numerals 601 to 606 denote that tine recording start instruction said the recording stop instruction are made to the recording medium A110 and the recording medium B111 at each timing. Reference numerals 611 to 613 denote moving image data recorded in the recording medium A110. Reference numeral 721 denotes moving image data recorded in the recording medium B111. Reference numerals 610 to 635 denote indication states of the recording state indication unit 121. It is assumed that the H (High) side corresponds to the on-lighting state, the L (Low) side corresponds to the off-lighting state, and a state where the H side and the L side are repeated in a short time is an on and off-lighting state (for example, 632).

First, at timing of 601, since both of the recording medium A110 and the recording medium B111 are in the recording stop state, the recording state indication unit 121 is in the off-lighting state. Although the recording start instruction to the recording medium B111 is made at timing of 602, since the recording medium A110 is in the recording step state, the recording state indication unit 121 is set into the on and off-lighting state. Since the recording start instruction to the recording medium A110 is made at timing of 603, the recording state indication unit 121 is set into the on-lighting state. Since the recording stop instruction to the recording medium A110 is mace at timing of 604, the recording state indication unit 121 is set into the on and off-lighting state. Since the recording start instruction to the recording medium A110 is made again at timing of 600, the recording state indication unit 121 is set info the on-lighting state. Those controls are continuously performed. Since the recording stop instruction to the recording medium B111 is made at timing of 606 and the recording medium A110 is in the recording stop state, the recording state indication unit 121 is set into the off-lighting state. By those control, the recording state indication unit 121 is set into the off-lighting state for an interval such as 631 or 635, is set into the on-lighting state for an interval such as 633 or the like, and is set into the on and off-lighting state for an interval such as 632, 634, or the like.

Figure 7:
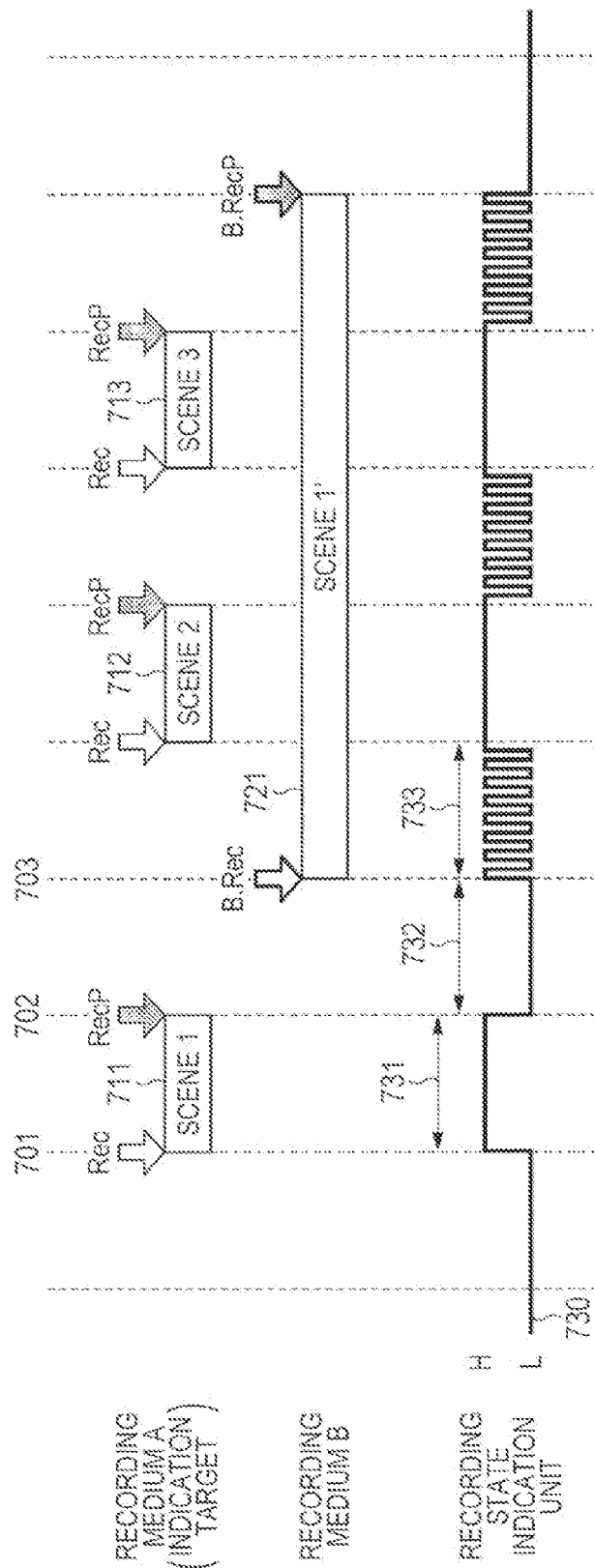
FIG. 7 is a diagram illustrating an example of an indication or a recording state according to the second embodiment of the invention.

FIG. 7 illustrates a recording state of each recording medium and a state of the recording state indication unit 121 in the case where the user independently instructs the recording start and stop to the recording medium A110 and the recording medium B111 in the normal recording mode. In FIG. 7, reference numerals 701 to 703 denote that the recording start instruction and the recording stop instruction are made to the recording medium A110 and the recording medium B111 at each timing. Reference numerals 711 to 713 denote moving image data recorded in the recording medium A110. Reference numeral 721 denotes the moving image data recorded in the recording medium B111. Reference numerals 730 to 733 denote indication states of the recording state indication unit 121. It is assumed that the H (high) side corresponds to the on-lighting state, the L (Low) side corresponds to the off-lighting state, and a state where the H side and the L side are repeated in a short time is an on and off-lighting state (for example, 733).

Figure 8:
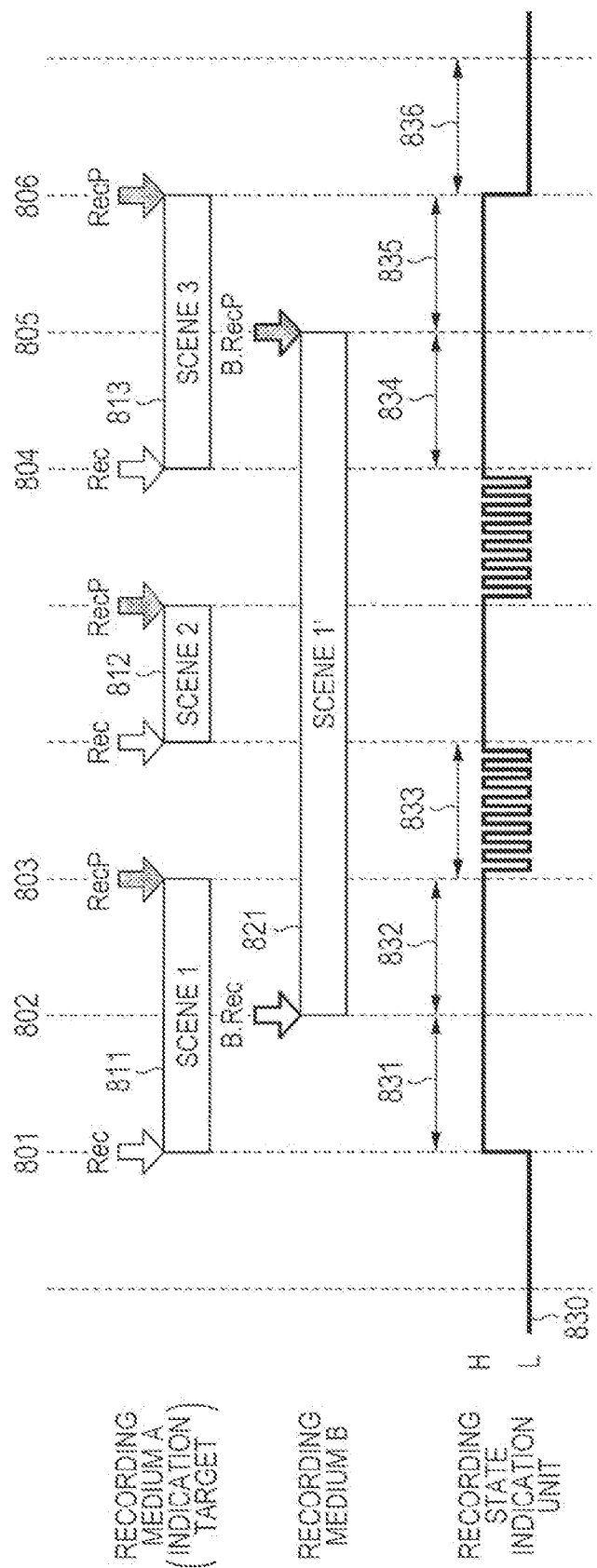
FIG. 8 is a diagram illustrating an example of an indication of a recording state according to the second embodiment of the invention.

First, since the recording start instruction to the recording medium A110 is made at timing of 701, although the recording medium B111 is in the recording stop state, the recording state indication unit 121 is set into the on-lighting state. Since the recording stop instruction to the recording medium A110 is made at timing of 702, the recording state indication unit 121 is set into the off-lighting state. Although the recording start instruction to the recording medium B111 is made at timing of 703, since the recording medium A110 is in the recording stop state, the recording state indication unit 121 is set into the on and off-lighting state. By those controls, the recording state indication unit 121 is set into the off-lighting state for an interval such as 732 or the like, is set into the on-lighting state for an interval such as 731 or the like, and is set into the on and off-lighting state for an interval such as 733 or the like.

in FIG. 8, reference numerals 801 to 806 denote that the recording start instruction and the recording stop instruction are made to the recording medium A110 and the recording medium B111 at each timing. Reference numerals 811 to 813 denote moving image data recorded in the recording medium A110. Reference numeral 821 denotes the moving image data recorded in the recording medium B111. Reference numerals 830 to 836 denote indication states of the recording state indication unit 121. It is assumed that the H (High) side correspond to the on-lighting state, the L (Low) side corresponds to the off-lighting state, and a state where the H side and the L side are repeated in a short time is an on and off-lighting state (for example, 833).

First, since the recording start instruction to the recording medium A110 is made at timing of 801, although the recording medium B111 is in the recording stop state, the recording state indication unit 121 in set into the on-lighting state. Although the recording start instruction to the recording medium B111 is made at timing of 802, since the recording medium A110 is inherently in the recording state, the recording state indication unit 121 is held in the on-lighting state. Since the recording stop instruction no the recording medium A110 is made at timing of 803, the recording state indication unit 121 is set into the on and off-lighting state. Since the recording start instruction to the recording medium A110 is made at timing of 804, the recording state indication unit 121 is set into the on-lighting state. Although the recording stop instruction to the recording medium B111 is made at timing of 805, since the recording medium A110 is in the recording state, the recording state indication unit 121 is still held in the on-lighting state. Since the recording stop instruction to the recording medium. A110 is made at turning of 806, the recording state indication unit 121 is set into the off-lighting state. By those control, the recording state indication unit 121 is set into the off-lighting state for an interval such as 836 or the like, is set into the on-lighting state for an interval such as 831, 832, 834, 835, or the like, and is set into the on and off-lighting state for an interval such as 833 or the like.

Figure 9:
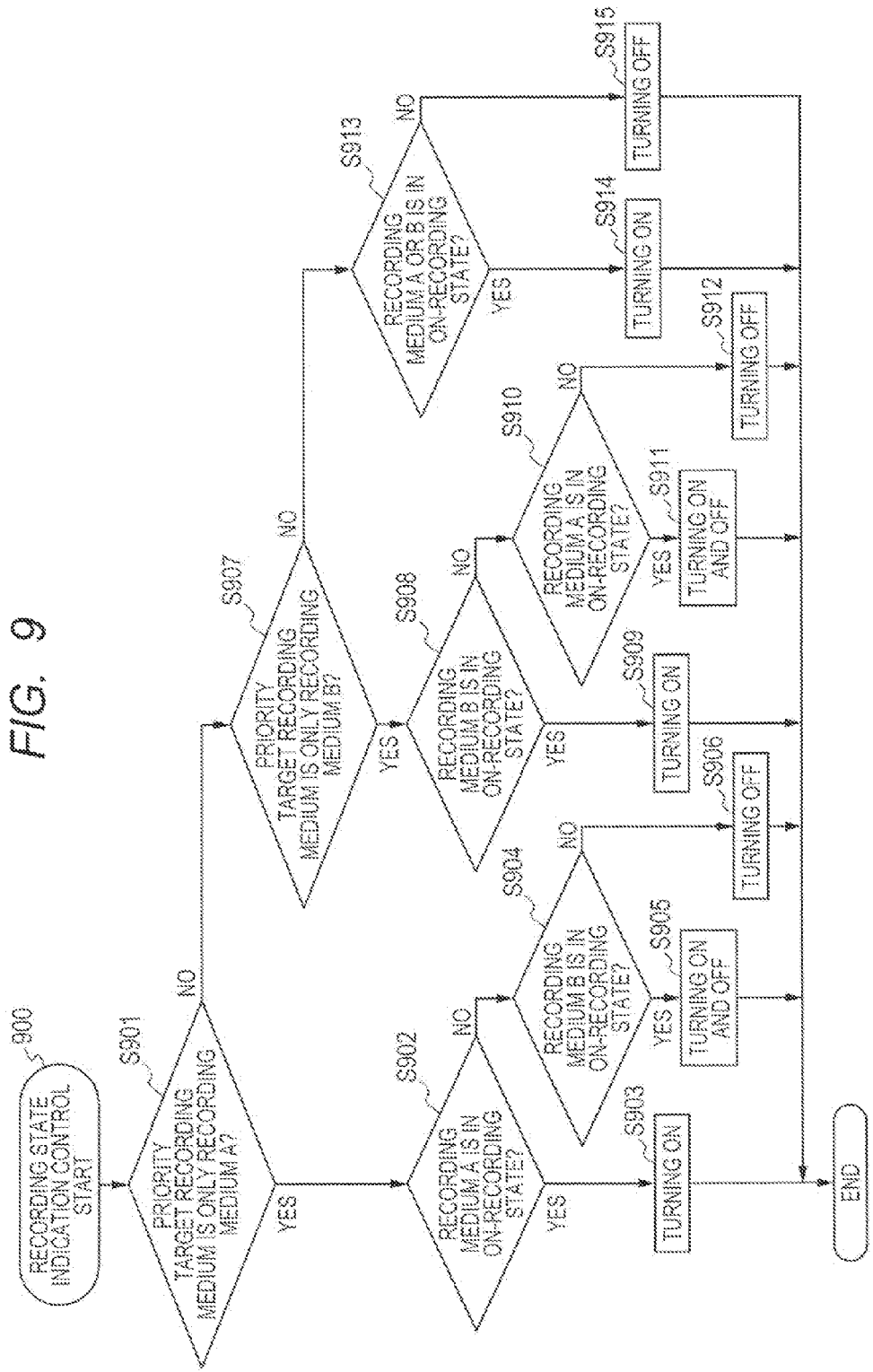
FIG. 9 is a diagram illustrating a flowchart for the control operation of the indication of the recording state according to the second embodiment of the invention.

FIG. 9 illustrates a flowchart for the control operation of the recording state indication unit 121. The operation according to the flowchart of FIG. 9 is executed by such a way that the control unit 101 controls each unit or the imaging apparatus.

A flowchart 900 shows the control operation of the recording state indication unit 121 and is periodically executed in the case of a setting for indicating the recording state. In the case of a setting that the indication of the recording state is not performed, for example, in the case of an OFF setting of the tally lamp, the flowchart 900 is not executed.

First, the control unit 101 discriminates the target recording medium of the recording state indication with priority (S901). This discrimination can be performed by referring to the setting information of the indication target stored in the memory 102. When the target is only the recording medium A110, the control unit 101 executes S902. If NO, the control unit 101 executes S907. When the target is only the recording medium A110, the control unit 101 obtains the state or the recording medium A110 through the recording medium control unit 109 and discriminates whether or not the recording medium A110 is in the on-recording state (902). If the recording medium A110 is in the on-recording state, the recording state indication unit 121 is turned on (S903). If the recording medium A110 is not in the on-recording state, the control unit 101 obtains the state of the recording medium B111 through the recording medium control unit 109 and discriminates whether or not the recording medium B111 is in the on-recording state (S904). If the recording medium B111 is in the on-recording state, the recording state indication unit 121 is turned on and off (S905). If the recording medium B111 is not in the on-recording state, the recording state indication unit 121 is turned off (S906). In S907, the control unit 101 discriminates the target recording medium of the recording state indication with priority. When the target is only the recording medium B111, the control unit 101 executes S908. If NO, the control unit 101 executes S913. When the target is only the recording medium B111, the control unit 101 obtains the state of the recording medium B111 through the recording medium control unit 109 and discriminates whether or not the recording medium B111 is in the on-recording state (S908). If the recording medium B111 is in the on-recording state, the recording state indication unit 121 is turned on (S909). If the recording medium B111 is not in the on-recording state, the control unit 101 obtains the state of the recording medium A110 through the recording medium control unit 109 and discriminates whether or not the recording medium A110 is in the on-recording state (S910). If the recording medium A110 is in the on-recording state, the recording state indication unit 121 is turned on and oft (S911). If the recording medium A110 is not in the on-recording state, the recording state indication unit 121 is tamed off (S912). In S913, the control unit 101 operates on the assumption that the target recording medium of the recording state indication is both of the recording medium A110 and the recording medium B111. The control unit 101 obtains the states of the recording medium A110 and the recording medium B111 through the recording medium control unit 109 and discriminates whether or not one or both of the recording medium A110 and the recording medium B111 is/are in the on-recording state (S913). When one or both of the recording medium A110 and the recording medium B111 is/are in the on-recording state, the recording state indication unit 121 is turned on (S914). If the recording medium A110 and the recording medium B111 are both not in the on-recording state, the recording state indication unit 121 is turned off (S915). The flowchart 900 has been describes above.

As mentioned above, also in the modification, in the case where one of the two recording mediums is set to a medium for main use, the recording start/stop instruction to such a medium is made, the other is set to a medium for backup use, and the recording start/stop instruction to such a medium is made, the recording state indication unit can be controlled in accordance with the recording state of the recording medium. For example, when the main recording medium is the indication target, the recording state indication unit is turned on during the recording of such a medium, the recording state indication unit is turned on end off when the recording medium is in the recording stop state and the backup recording medium is in the on-recording state, and the recording state indication unit is turned off when the main recording medium is in the recording stop state and the backup recording medium is in the recording stop state. Thus, a fact that the main recording medium is in the on-recording state, that as, it is in the on-recording state which is not desired by the photographer can be correctly indicated to the person to be photographed. Further, a fact that the backup recording medium is in the on-recording state, that is, it is in the on-recording state which is not desired by the photographer can be correctly indicated to the person being photographed.

Also in the modification, in a mariner similar to the first embodiment, in place of such a construction that the recording state indication unit 121 is constructed by using a light-emitting element, it as also possible to construct in such a manner that the emission color is switched in accordance with the setting of the indication target. It is also possible to construct in such a manner that the setting of the indication target is displayed to the display unit 107 so that the photographer can visually confirm it.

Second Embodiment

In the first embodiment, the target of the recording start indication is determined from the recording medium A110 and the recording medium B111 by the setting of use user. In the second embodiment, in the normal recording mode, when at least one of the recording mediums is in the recording state, the recording state indication unit 121 is set into the on-lighting state, and when the recording mediums are both not in the recording state, the recording state indication unit 121 is set into the off-lighting state. During the backup recording, when the recording medium set as a medium for main use is in the recording state, the recording state indication unit 121 is set into the on-lighting state, and when the recording medium set as a medium for main use is in the recording stop state, the recording state indication unit 121 is set into the off-lighting state.

A fundamental construction and the recording operation of the video camera 100 in the present embodiment are similar to those in the first embodiment. In a manner similar to the setting of the recording medium which is an indication target, the control unit 101 sets the normal recording mode and the backup recording mode on the basis of the operation of the operation unit 105 by the user. Control of the recording state indication unit 121 in the embodiment will be described hereinbelow.

The recording medium which is set as a medium for main use by the user between the recording medium A110 and the recording medium B111 in the backup recording mode is determined by the control unit 101 as a target or the recording state indication. In the normal recording mode, when the moving image data is being recorded to at least one of the recording medium A110 and the recording medium B111, the control unit 101 sets the recording state indication unit 121 into the on-lighting state, and when the moving image data is not recorded to any one of the recording mediums, the control unit 101 sets the recording state indication unit 121 into the off-lighting state.

Figure 10A:
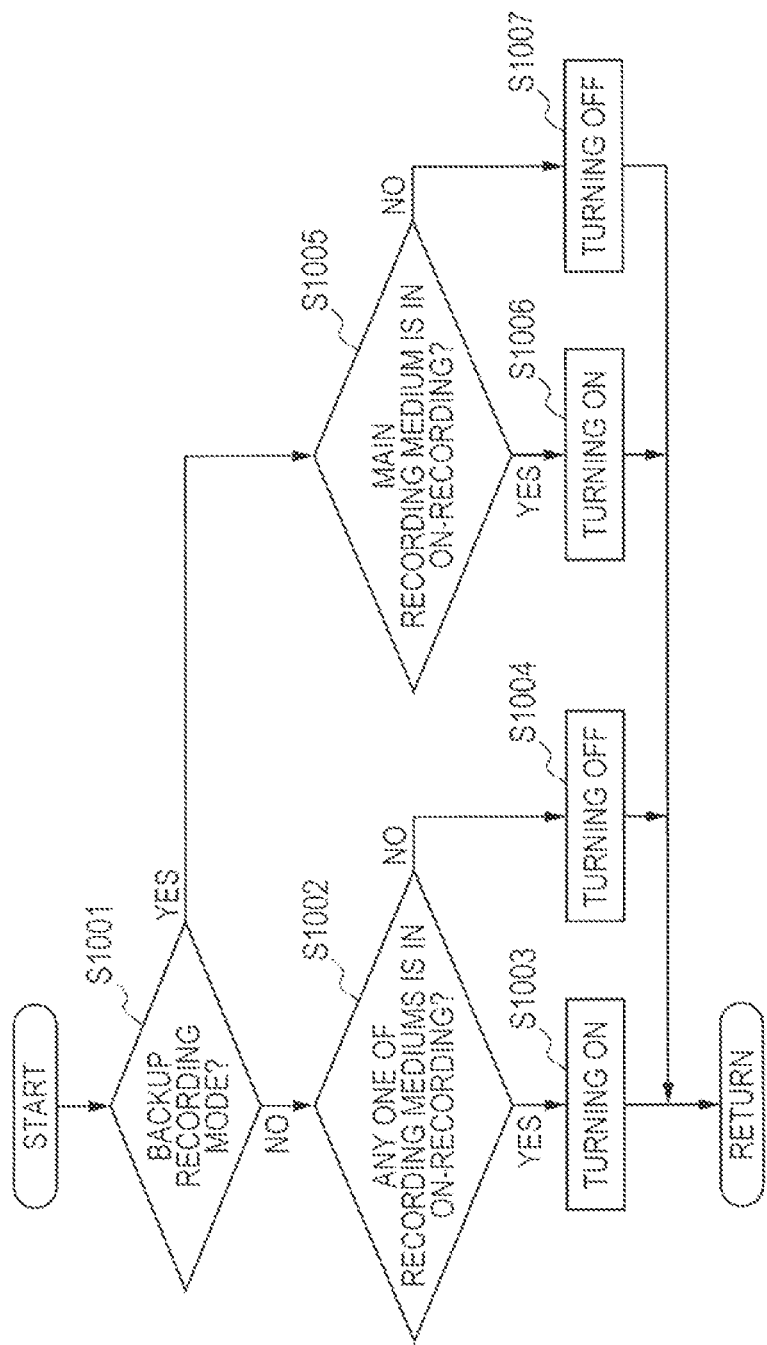
FIGS. 10A and 10B are diagrams illustrating flowcharts for the control operation of the indication of the recording state according to the second embodiment of the invention.

FIG. 10A is a flowchart showing the control operation of the recording state indication unit 121 in the second embodiment. The operation in FIG. 10A is repeatedly executed by the control unit 101 at predetermined timing.

In FIG. 10A, the control unit 101 discriminates whether or not the video camera 100 is set into the backup recording mode at present (S1001). If it is not set into the backup recording mode, the control unit 101 detects whether or not the moving image data is being recorded any one of the recording medium A110 and the recording medium B111 by the recording medium control unit 109 (S1002). When the moving image data is being recorded to one of the recording mediums, the control unit 101 sets the recording state indication unit 121 into the on-lighting state (S1003). If the moving image data is not recorded to any one of the recording mediums, the control unit 101 sets the recording state indication unit 121 into the off-lighting state (S1004).

If it is determined in S1001 that the video camera a 100 as in the backup on-recording state, the control unit 101 discriminates whether or not the moving image data is being recorded to the recording medium which is set as a medium for main use, by the recording medium control unit 109 (S1005). When the moving image data is being recorded to the main recording medium, the control unit 101 sets the recording state indication unit 121 into the on-lighting state (S1006). If the main recording medium is in the recording stop state and when the moving image data is being recorded only to the recording medium for backup use, the control unit 101 sets the recording state indication unit 121 into the off-lighting state (S1007).

As mentioned above, in the present embodiment, in the normal recording mode, when any one of the recording mediums is in the recording state, the recording state indication unit 121 is turned on. Therefore, the photographer and the object being photographed can easily recognize a fact that the recording medium is in on-recording state.

When the backup recording is started, the recording state indication unit 121 is turned on during recording the moving image data into toe recording medium which is set as a medium for main use. If NO, the recording state indication unit 121 in turned off. Therefore, in the backup recording, the photographer and the object can easily recognize the recording state of the main recording medium for which the recording start and stop are controlled in accordance with the operation of the user.

Modification of the Second Embodiment

Also in the present modification, in a manner similar to the modification of the first embodiment, in a state where one of the recording mediums is in the recording stop state, when the other recording medium is in the recording state, the recording state indication unit 121 is turned on and off.

Figure 10B:
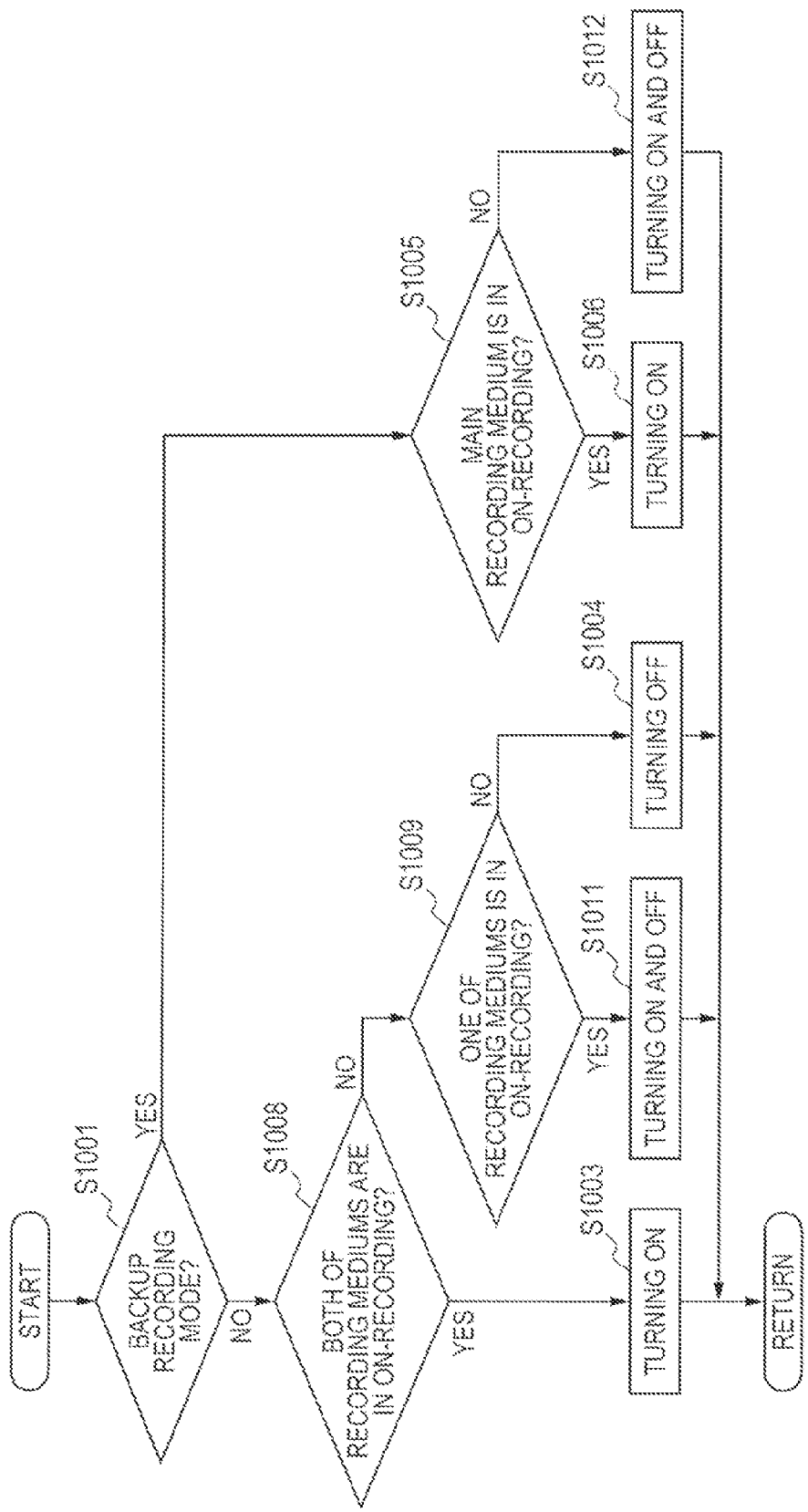

FIG. 10B is a flowchart showing the control operation of the recording state indication unit 121 in the present modification. The operation in FIG. 10B is repeatedly executed by the control unit 101 at predetermined timing. In FIG. 10B, processings similar to those in FIG. 10A are designated by the same step numbers.

In FIG. 10B, the control unit 101 discriminates whether or not the video camera 100 is set into the backup recording mode at present (S1001). If it is not set into the backup recording mode, the control unit 101 detects whether or not the moving image data is being recorded to both of the recording medium A110 and the recording medium B111, by the recording medium control unit 109 (S1008). When the moving image data is being recorded to both of the recording mediums, the control unit 101 sets the recording state indication unit 121 into the on-lighting state (S1003). If the moving image data is not recorded to both of the recording mediums, the control unit 101 discriminates whether or not the moving image data is being recorded to one of the recording mediums (S1009). When the moving image data is being recorded to any one of the recording mediums, the control unit 101 sets the recording state indication unit 121 into the on and off-lighting state (S1011). When the moving image data is not being recorded to any one of the recording mediums, the control unit 101 sets the recording state indication unit 121 into the off-lighting state (S1004).

If it is determined in S1001 that the video camera 100 is in the backup on-recording state, the control unit 101 discriminates whether or not the moving image data is being recorded to the recording medium which is set as a medium for main use, by the recording medium control unit 109 (S1005). When the moving image data is being recorded to the main recording medium, the control unit 101 sets the recording state indication unit 121 into the on-lighting state (S1006). If the main recording medium is in the recording stop state and when the moving image data is being recorded only to the recording medium for backup use, the control unit 101 sets the recording state indication unit 121 into the on and off-lighting state.

Although an example in which the recording apparatus of the invention has been provided to record the moving image data photographed by the video camera 100 is shown in the first embodiment and its modification, for example, the invention can be also applied to a recording apparatus of information data of another type such as a type in which audio data collected by a microphone is recorded or the like.

As described above, according to the invention, in a recording apparatus having a unit for asynchronously performing the recording start and recording stop of the moving image data to the recording medium for main use and the recording medium for backup use, information about whether or not the recording medium is in on-recording state which is desired by the photographer can be correctly indicated.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided so the computer, for example, from a network or the storage medium. The storage mediums may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

Although the invention has been described in detail above on the basis of the exemplary embodiments, the invention is not limited to those specific embodiments but various modifications within a scope without departing from the essence of the invention are also incorporated in the invention. A part of the foregoing embodiments may be properly combined.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-024541, filed Feb. 12, 2013, which is hereby incorporated by reference herein in its entirety.

What is claimed is:

1. An imaging apparatus comprising:
    an image pickup unit;
    a recorder that records moving image data obtained by the image pickup unit into a plurality of recording medium including a first recording medium and a second recording medium, the recorder being capable of recording the moving image data into the second recording medium while recording the moving image data into the first recording medium;
    a lighting unit;
    a receiver that receives a selection instruction to select one of the first recording medium and the second recording medium and a recording start instruction; and
    a controller that controls the lighting unit in accordance with a result of the selection caused by the selection instruction,
    wherein in a case where the first recording medium is selected, the controller controls the lighting unit so as to turn into a state different from a predetermined state in a state where recording the moving image data into the first recording medium is stopped and the moving image data is being recorded into the second recording medium, and to turn into the predetermined state in accordance with the recording start instruction to start recording the moving image data into the first recording medium during recording the moving image data into the second recording medium, and
    in a case where the second recording medium is selected, the controller controls the lighting unit so as to turn into the state different free the predetermined state in a state where recording the moving image data into the second recording medium is stopped and the moving image data is being recorded into the first recording medium, and to turn into the predetermined state in accordance with the recording start instruction to start recording the moving image data into the second recording medium during recording the moving image data into the first recording medium.

2. The imaging apparatus according to claim 1, wherein in a state where recording the moving image data into the first recording medium and recording the moving image data into the second recording medium are both stopped, the controller further controls the lighting unit so as to turn into the state different from the predetermined state.

3. The imaging apparatus according to claim 2, wherein the predetermined state is an on-lighting state and the state different from the predetermined state is an off-lighting state.

4. The imaging apparatus according to claim 1, wherein:
    in the case where the first recording medium is selected, in the state where recording the moving image data into the first recording medium is stopped and the moving image data is being recorded into the second recording medium, the controller controls the lighting unit so as to turn into a first state; and
    in the case where the second recording medium is selected, in the state where recording the moving image data into the second recording medium is stopped and the moving image data is being recorded into the first recording medium, the controller controls the lighting unit so as to turn into the first state.

5. The imaging apparatus according to claim 4, wherein:
    in the state where recording the moving image data into the first recording medium and recording the moving image data into the second recording medium are both stopped, the controller further controls the lighting unit so as to turn into a second state; and
    the predetermined state is an on-lighting state, the first state is an on and off-lighting state, and the second state is an off-lighting state.

6. The imaging apparatus according to claim 1, wherein
    in the case where the first recording medium is selected, in the state where recording the moving image data is being recorded into the first recording medium and the moving image data into the second recording medium is stopped, the controller controls the lighting unit so as to turn into the predetermined state; and
    in the case where the second recording medium is selected, in the state where recording the moving image data is being recorded into the second recording medium and the moving image data into the first recording medium is stopped, the controller controls the lighting unit so as to turn into the predetermined state.

7. The imaging apparatus according to claim 1, wherein the controller controls the lighting unit so as to indicate to a person to be photographed a recording state of the moving image data into the recording medium.

8. A control method of controlling an imaging apparatus including an image pickup unit and a lighting unit, comprising the steps of:
    recording moving image data obtained by the image pickup unit into a plurality of recording medium including a first recording medium and a second recording medium, the recording step including a step of recording the moving image data into the second recording medium while recording the moving image data into the first recording medium;
    receiving a selection instruction to select one of the first recording medium and the second recording medium and a recording start instruction; and
    controlling the lighting unit in accordance with a result of the selection caused by the selection instruction,
    wherein, in a case where the first recording medium is selected, the lighting unit is controlled in the control step so as to turn into a state different from a predetermined state in a state where recording the moving image data into the first recording medium is stopped and the moving image data is being recorded into the second recording medium, and to turn into the predetermined state in accordance with the recording start instruction to start recording the moving image data into the first recording medium during recording the moving image data into the second recording medium, and
    in a case where the second recording medium is selected, the lighting unit is controlled in the control step so as to turn into the state different from the predetermined state in a state where recording the moving image data into the second recording medium is stopped and the moving image data is being recorded into the first recording medium, and to turn into the predetermined state in accordance with the recording start instruction to start recording the moving image data into the second recording medium during recording the moving image data into the first recording medium.

* * * * *